(12) United States Patent
Meffe et al.

(10) Patent No.: US 6,775,599 B2
(45) Date of Patent: Aug. 10, 2004

(54) MULTI-FUNCTION REACTION WHEEL ASSEMBLIES FOR CONTROLLING SPACECRAFT ATTITUDE

(75) Inventors: Marc E. Meffe, Glendale, AZ (US); Jack H. Jacobs, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 212 days.

(21) Appl. No.: 10/192,838

(22) Filed: Jul. 10, 2002

(65) Prior Publication Data

US 2004/0010355 A1 Jan. 15, 2004

(51) Int. Cl.[7] .............................. G06F 17/00; B64G 1/28
(52) U.S. Cl. .......................... 701/13; 244/164; 244/165
(58) Field of Search ............................... 701/13, 4, 226, 701/220; 244/158 R, 164, 165, 169, 170, 171

(56) References Cited

U.S. PATENT DOCUMENTS

| | | | | |
|---|---|---|---|---|
| 5,047,945 A | * | 9/1991 | Paluszek ...................... 701/13 |
| 5,058,835 A | * | 10/1991 | Goodzeit et al. ............ 244/165 |
| 5,201,833 A | * | 4/1993 | Goodzeit et al. ............ 244/165 |
| 6,600,976 B1 | * | 7/2003 | Goodzeit et al. .............. 701/13 |
| 6,648,274 B1 | * | 11/2003 | Bailey et al. ................ 244/165 |
| 2003/0149529 A1 | * | 8/2003 | Heatwole et al. ........... 701/220 |
| 2003/0192996 A1 | * | 10/2003 | Jacobs et al. ................ 244/164 |

OTHER PUBLICATIONS

Hayden J L, "Spacecraft/Ground Architectures using Internet Protocols to Facilitate Autonomous Mission Operations," IEEE Aerospace Conference Proceedings, vol. 2, Mar. 18, 2000, pp. 163–177, p. 170 column 2, pgraph 2–pgraph 3, figs. 10, 12.

* cited by examiner

Primary Examiner—Thomas G. Black
Assistant Examiner—Ronnie Mancho

(57) ABSTRACT

A plurality of sensors provide spacecraft attitude signals to reaction wheel assemblies which provide converted signals to a flight controller that controls the reaction wheel assemblies. The reaction wheel assemblies include a secondary power supply to power the sensors, and power can be regenerated from the reaction wheels. A microcomputer in the reaction wheel assemblies can control the reaction wheel assemblies in place of the flight controller.

16 Claims, 2 Drawing Sheets

MULTI-FUNCTION REACTION WHEEL ASSEMBLIES FOR CONTROLLING SPACECRAFT ATTITUDE

BACKGROUND

This invention relates to spacecraft attitude control systems that use sensors to provide attitude information to a flight controller that controls reaction wheels to adjust attitude.

Many spacecraft, including satellites, have attitude control systems that use sun sensors, earth sensors and/or inertial sensors to determine attitude and reaction wheel assemblies (RWA) in an arrangement shown in FIG. 1 to rotate the spacecraft to an desired attitude. An attitude control system (ACS) receives signals from the sensors to determine spacecraft attitude, computes the required attitude and commands a change of speed for the reaction wheels, causing the spacecraft to rotate around its axes to the correct or desired attitude. An RWA is called an assembly because it comprises a wheel mass, electric motor and controls as a single unit. The ACS is part (one function) of an onboard computer system. Electrical power for the sensors and reaction wheels is provided over a central spacecraft power bus. The individual power requirements for the sensors and reaction wheels can be dramatically different, frequently between 20 and 100 volts. The practical effect is that each sensor and reaction wheel must include its own internal secondary power supply, which converts the spacecraft primary voltage to usable voltage levels for each component. Furthermore, each sensor and wheel must have a appropriate input/output (I/O) or converter protocol to communicate with the ACS, for instance the 1553 standard that is shown in FIG. 1.

This architecture introduces several system obstacles: Providing a secondary power supply for each sensor adds considerably to weight, complexity and cost. Because each sensor provides data directly to the ACS, its I/O must be compatible with the ACS I/O, which is more expensive and complex.

SUMMARY

A spacecraft attitude control system using RWAs can be improved by providing secondary power to the sensors from power supplies that are included in the RWA and by passing the sensor signals through the RWA where they can be converted into a suitable format for the ACS, reducing the complexity and cost of the sensors. Moreover, one or more RWAs can contain a microcomputer to control the RWAs using the sensor signals independently (as an alternative) of the ACS. The sensor signals can be applied to RWAs configured to be primary RWAs and secondary or slave RWAs. The slave RWAs provide the sensor signals to the ACS if the primary RWAs are inoperative. Backup electrical power for the system can be generated from the rotating reaction wheels if the main spacecraft bus power is interrupted.

DESCRIPTION

Figure 1:
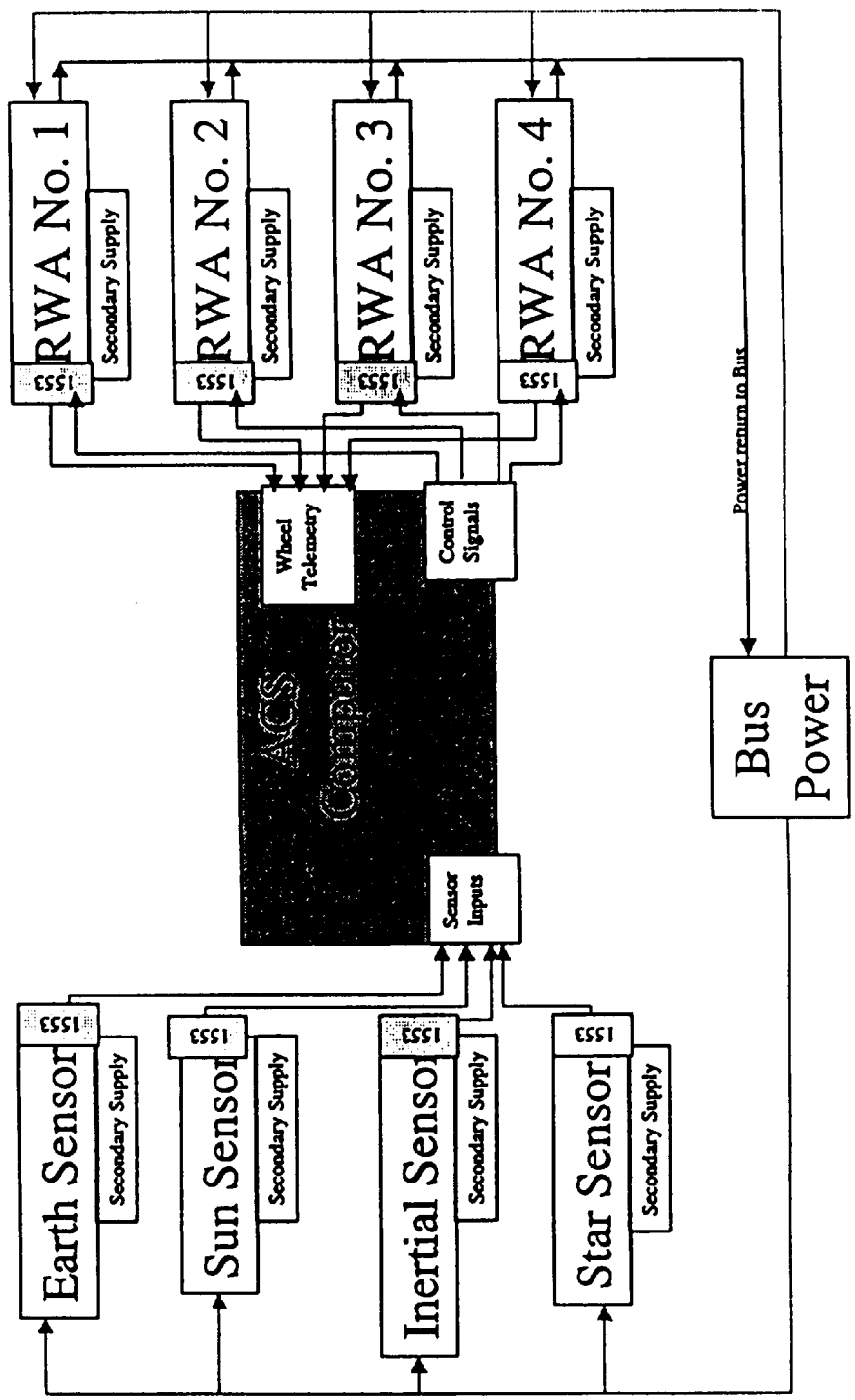
FIG. 1 is a functional block diagram of a prior art spacecraft attitude control system.
Figure 2:
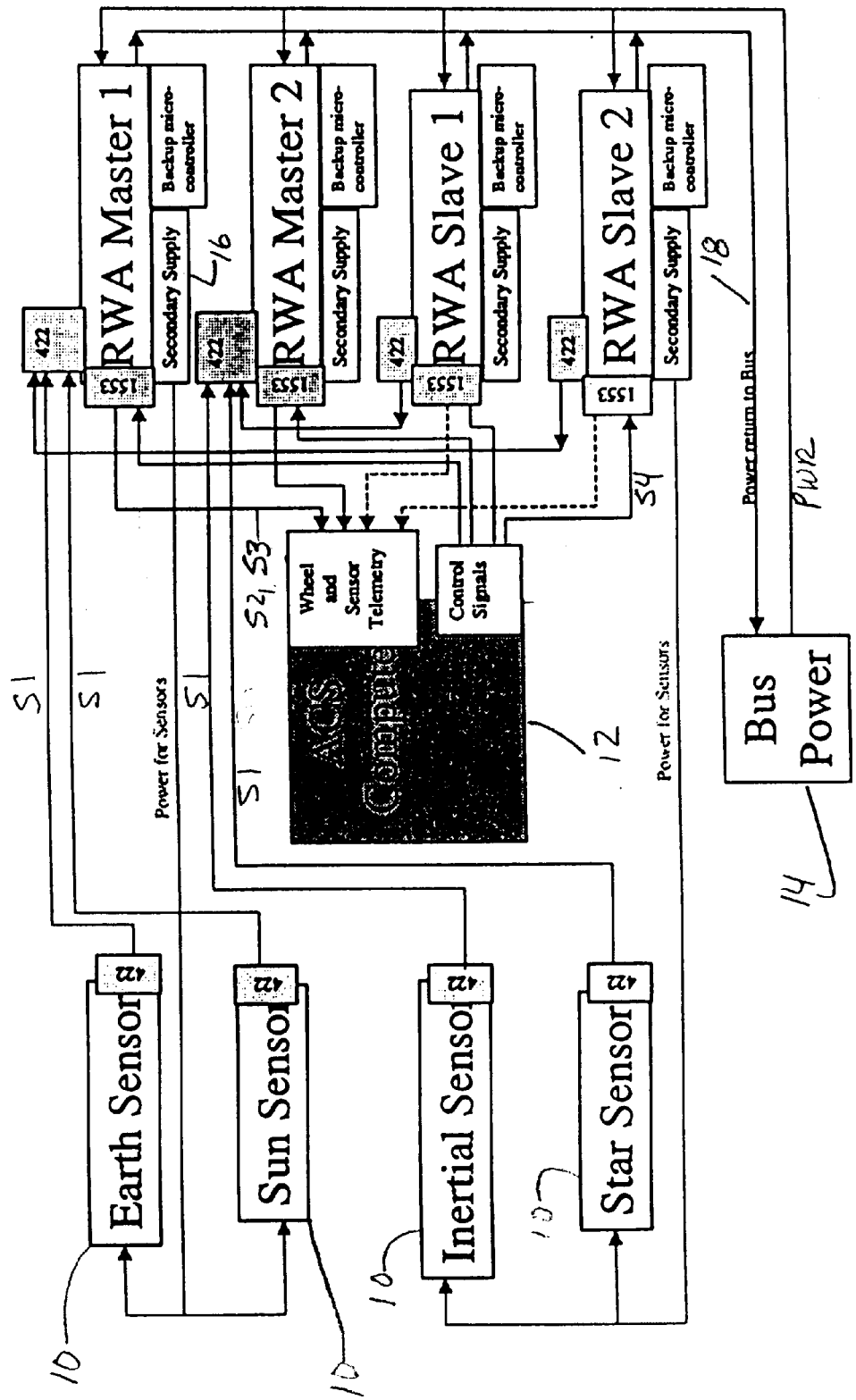
FIG. 2 is a functional block diagram of spacecraft attitude control system embodying the present invention.

Referring to FIG. 2, four spacecraft attitude sensors 10 include 422 standard I/Os (signal converters) for providing attitude signals S1 to corresponding 422 I/Os on master 1 and 2 RWAs and slave 1 and 2 RWAs. Each RWA has a 1533 standard I/O through which wheel signals S2 and sensor telemetry signals S3 (a function of signals Sn) are transmitted/received with an ACS 12. The control signals S4 produced by the ACS control the speed of each reaction wheel assembly 10. Changing the RWA speed rotates the spacecraft. The ACS computes speed changes using an attitude algorithm that includes error between a desired or commanded attitude and the actual attitude, manifested by signals Sy. The ACS may be subroutines in an on-board flight controller for many spacecraft operations. As will be explained, one aspect of the invention includes providing that capability in one or more of the reaction wheel assemblies.

A bus power supply 14 provides power (PWR) to the RWAs, which include secondary power supplies 16 that power the sensors. The slave RWAs are connected to the sensors in parallel with the master RWAs, each of which receives signals from two of the sensors 10. Regenerated power can be supplied to the power bus from the RWAs over a power return line 18. Each master RWA microcomputer can process the sensor signals Sn to control the other RWAs if the ACS is out of order. In addition, each slave RWA can provide the signals Sx, Sy to the ACS, as shown by the dotted line, alternative to the path through the master RWAs. In addition, to having the capacity to control the other RWAs, each microcomputer can control its own RWA electric motor (not shown) to regenerate power over the power return line. Each RWA and its microcomputer can operate without the bus power for a limited amount of time if main bus power is lost, by utilizing the energy stored within the rotor. This energy can be used to safely shut down all the sensors and RWAs, including sending telemetry signals over the spacecraft bus for use in a later system startup For example, the secondary power supply 16 that is contained in RWA master powers the earth and sun sensors and the secondary power supply 16 that is contained in RWA slave powers the inertial and sun sensors.

One skilled in the art may make modifications, in whole or in part, to a described embodiment of the invention and its various functions and components without departing from the true scope and spirit of the invention.

What is claimed is:

1. A spacecraft attitude control comprising:
    a plurality of means for sensing spacecraft attitude;
    a plurality of reaction wheel assemblies;
    first attitude control means for controlling said reaction wheel assemblies;
    first I/O means for operating according to a first standard and located on each of said plurality of sensing means to produce spacecraft attitude signals;
    second I/O means for operating according to said first standard and located on one or more of said reaction wheels to receive said spacecraft attitude signals; and
    third I/O means operating according to a second standard and located on each of said reaction wheel assemblies for providing attitude signals, as a function of said spacecraft attitude signals to said first attitude control means.

2. The spacecraft attitude control described in claim 1, further comprising:
    a secondary power supply on one or more of said reaction wheel assemblies to power each of said means for sensing.

3. The attitude control described in claim 2, wherein each reaction wheel assembly receives spacecraft attitude signals from less that all of said plurality of sensors.

4. The attitude control according to claim 2, wherein each reaction wheel assembly comprises means for controlling spacecraft attitude using said spacecraft attitude signals.

5. The attitude control according to claim 4, wherein said means for controlling spacecraft attitude comprises a microcomputer.

6. The attitude control according to claim 1, wherein one or more of said plurality of reaction wheel assemblies comprises means for controlling spacecraft attitude using said spacecraft attitude signals.

7. The attitude control according to claim 6, wherein said means for controlling spacecraft attitude comprises a microcomputer.

8. The spacecraft attitude control described in claim 1, further comprising:

a secondary power supply on one or more of said reaction wheel assemblies to power each of said means for sensing and powered by regenerating power from a rotating reaction wheel.

9. A method for controlling spacecraft attitude comprising:

sensing spacecraft attitude with sensors to provide attitude signals to reaction wheel assemblies;

providing said attitude signals to an controller from a reaction wheel assembly to compute control signals that are applied to said reaction wheel assemblies to change spacecraft attitude; and providing power to sensors from a secondary power supply on a reaction wheel assembly.

10. The method described in claim 9, further comprising:

controlling the reaction wheel assemblies to change spacecraft attitude with a microcomputer on a reaction wheel assembly.

11. The method described in claim 9, further comprising:

using a reaction wheel assembly to provide power to the secondary power supply.

12. A method for controlling the attitude of a spacecraft comprising:

applying sensor produced spacecraft attitude signals to a plurality of reaction wheel assemblies; and applying said attitude signals from said reaction assemblies to a flight controller that controls said reaction wheel assemblies a function of said attitude signals.

13. The method of claim 12, further comprising:

controlling said reaction wheel assemblies using a microcomputer on one or more of the reaction wheel assemblies using said attitude signals when said attitude control is inoperative.

14. A combination comprising:

reaction wheel assemblies;

sensors for providing first signals manifesting the attitude of a spacecraft, one or more of said reaction wheels assemblies receiving said first signals;

a controller adapted for changing the speed of said reaction wheel assemblies in response to second signals provided by a reaction wheel assembly from said first signals; and a second controller on a reaction wheel assembly adapted for changing the speed of said reaction wheel assemblies in response to said first signals.

15. The combination described in claim 14, further comprising:

a secondary power supply on a reaction wheel that powers said sensors.

16. The combination described in claim 15, wherein power for the secondary power supply can be regenerated from the rotation of a reaction wheel.

* * * * *